Oct. 29, 1963  K. W. ABENDROTH  3,109,168
CHANGEABLE INDICATORS FOR DISPLAY DEVICES
Filed July 1, 1959

INVENTOR.
K.W. ABENDROTH
BY
Forrest B. Hitchcock
HIS ATTORNEY

United States Patent Office 3,109,168
Patented Oct. 29, 1963

3,109,168
CHANGEABLE INDICATORS FOR DISPLAY
DEVICES
Karl W. Abendroth, Rochester, N.Y., assignor to General
Signal Corporation, a corporation of New York
Filed July 1, 1959, Ser. No. 824,416
1 Claim. (Cl. 340—373)

This invention relates to changeable indicators for display devices, and more particularly relates to an indicator which may be electrically operated to either one of two positions and be retained in its last operated position when energy is removed.

The changeable indicator of the present invention comprises an electromagnetic device of the solenoid type having two windings and a movable core which is shifted to one position or the other in accordance with the energization of the appropriate winding. The movement of the core is utilized to rotate a shaft for operating an indicating ball to its opposite positions. Also, fastened to said shaft is a suitable spring biased toggle structure for holding it in its last operated position. Thus, energy is required only during an actual operation of the changeable indicator from one position to another.

The indicating unit in this particular embodiment consists of a molded plastic sphere or ball which is mounted on the driven shaft and rotates therewith. The visual indication is accomplished by having one hemisphere of the ball made one color and the other hemisphere of the ball made a different color.

More specifically, it is proposed in connection with the present embodiment of the invention to have the indicating ball limited in its movement to one hundred eighty degrees, with one hemisphere colored black and the opposite hemisphere colored white and mounted on a black panel through which a portion of the indicating ball will protrude. When the black hemisphere of the ball protrudes from the panel nothing is visible a short distance therefrom; whereas, when the white hemisphere of the indicating ball protrudes such white portion is clearly visible against the black background of the panel.

It is further proposed that various numbers of these indicating units may be used on individual black panels to be operated in combinations to display different numbers, letters or other symbols and characters as desired. The panel would be square or rectangular in shape as desired and be provided with multiple openings therein located in vertical and horizontal rows, and have a changeable indicator mounted behind each opening as described above. Assuming the face of the panel to be black in color, with the changeable indicators all operated to their black indicating positions, the panel would present a blank appearance on its front surface. However, with certain selected ones of the indicators operated to their white indicating positions, a number "2," for example, could be formed on the front of the panel as outlined by the display of the white spheres of the selected indicators against the black background of the panel.

Several of such character unit panels may be combined to form a large display board by locating them side by side and in lines so that words and numbers and other data may be displayed in billboard form. Such a type of billboard is particularly advantageous for use in vehicle and airway terminals or the like where the data displayed is of a nature wherein frequent changes are required.

Other objects, purposes and characteristic features of the invention will be pointed out as the description of the invention progresses, with reference to the accompanying drawings, in which.

Figure 2:
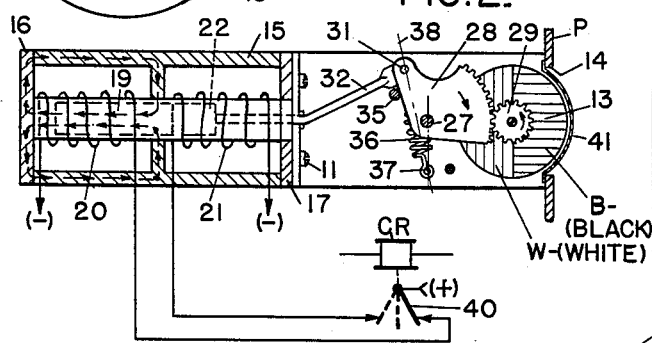
FIG. 2 is a schematic view of the apparatus shown in FIG. 1 and illustrates an operating means and shows the changeable indicator of the present invention operated to its assumed normal black color indicating position.
Figure 3:
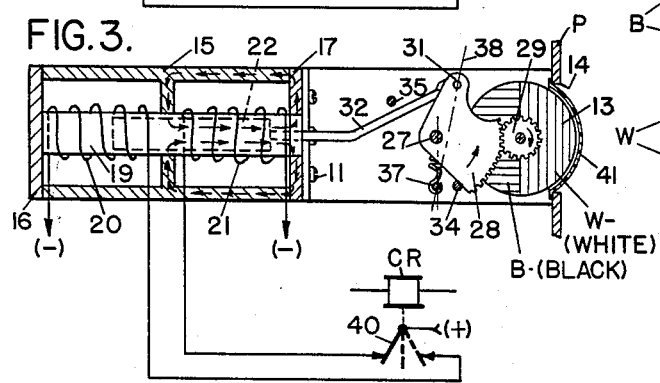
Figure 4:
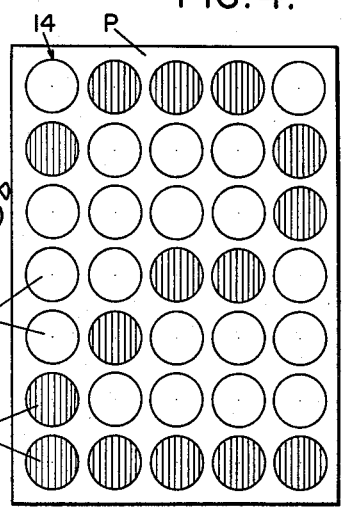

FIG. 3 is a view similar to FIG. 2 except that it shows the changeable indicator of the present invention operated to its white color indicating position; and FIG. 4 is a front view of a typical character unit panel of the type which may be used in practicing the invention and shows that certain of the changeable indicators of the present invention attached thereto have been operated to their white color indicating positions to form and display the figure number "2" in white colored spheres against the black color background of the panel.

Figure 1:
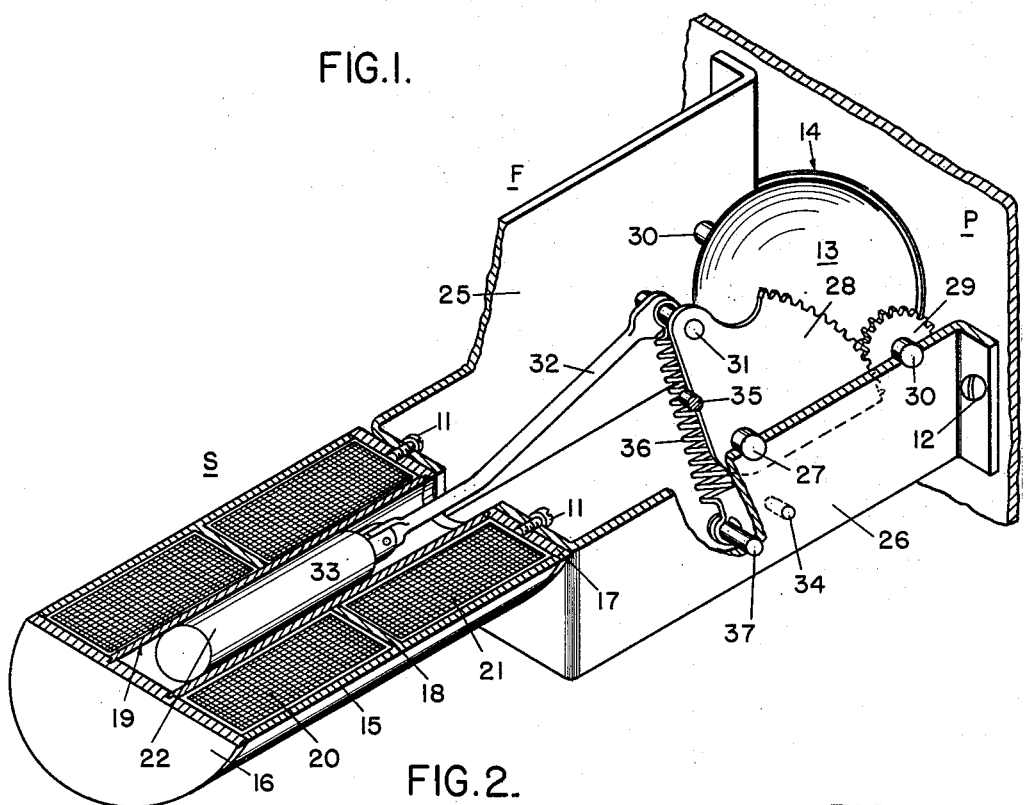
FIG. 1 is a diagrammatic view in perspective of the changeable indicator of the present invention and is shown partly in section to more clearly indicate the structure thereof.

Referring now more particularly to FIG. 1 of the drawings, the changeable indicator of the present invention comprises in general an electromagnetic solenoid unit S which is attached to a mechanism frame member F by means of screws 11 or the like. The frame member F is attached to a character unit panel P by means of screws 12, for example, or by a quick detachable means if desired. The mechanism frame F is located on the panel P so that the indicator unit 13 of the indicator mechanism, which is in the form of a sphere or ball, will partially protrude through a round opening 14 in the panel P (see FIG. 2).

More specifically, the electromagnetic solenoid S comprises an iron housing having a cylindrical body portion 15 and two end caps 16 and 17, and an intermediate wall 18 which separates the housing into two compartments. A nonmagnetic cylindrical tube 19 passes through the center of the housing and extends from the one end cap 16 to the other end cap 17. Two coil windings 20 and 21 are mounted on the nonmagnetic tube 19 and are positioned one within each compartment of the housing. An iron core piece 22 is slidably mounted within the tube 19, and is subject to movement in either direction by reason of the magnetic flux induced therein due to energization of one or the other of the coils 20 or 21.

The mechanism frame F consists of two side wall brackets 25 and 26 which are spaced apart and fastened to the end cap member 17 of the solenoid housing by the screws 11 as previously mentioned. The side wall bracket 26 is provided with a stud pin 27 which extends inwardly and has a gear sector 28 rotatably mounted thereon. The teeth of the gear sector 28 engage the teeth of a gear wheel 29 which is fixedly mounted on a shaft 30. The shaft 30 extends between the two side wall brackets 25 and 26 and is suitably journaled therein. The indicating unit or ball 13 is also fixedly mounted on the shaft 30.

The gear sector 28 is provided with a stud pin 31 to which is pivotally mounted one end of a crank arm or link 32. The other end of the link 32 is pivotally fastened to one end of the core piece 22 by means of a pin 33. Thus, it can be seen that lateral movement of the core piece 22 will cause the link 32 to rotate the gear sector 28 which in turn rotates the gear wheel 29 and its associated shaft 30 and indicator ball 13. The gear sector 28 is restricted in its arc of movement by the stop pins 34 and 35 which protrude from the side wall bracket 26. The amount of this gear sector movement and the gear ratio between it and the gear wheel 29 is such that the indicator ball 13 will rotate approximately one hundred and eighty degrees.

The indicator mechanism is also provided with a spring toggle over-center device which biases the gear sector 28 against its stop pins 34 and 35 when in its extreme operated positions. This spring toggle device consists of a tensioned spiral spring 36 which has one end fastened to the stud pin 31 and its other end fastened to another stud pin 37 which is fastened in the side wall 26 and is located directly below the pivot pin 27 on which the gear sector 28 rotates. As shown more clearly in FIGS. 2 and 3, the location of the various pins is such that the pivot pin 27 is off center with respect to a center line 38 drawn through the spring anchoring pins 31 and 37 when the gear sector 28 is operated beyond its center position in either direction.

The indicator ball 13 is preferably a molded plastic product and in this particular application of the invention it is proposed to indicate a different color in each of its two operated conditions, the achromatic colors black and white being chosen. As indicated in FIGS. 2 and 3, one hemisphere of the indicator ball 13 is colored black and designated B whereas the other hemisphere of the ball 13 is colored white and designated W.

In FIG. 4 there has been illustrated a typical character unit panel P to which the invention may be applied as previously mentioned. As an example, this panel P is provided with a plurality of circular openings 14 located adjacently in vertical and horizontal rows. Changeable indicators of the present invention are mounted on the back of the panel P as previously described and the indicator ball 13 of each indicator unit is visible through its respective opening 14. Assuming that the normal position of the indicator units is as shown in FIG. 2, the black colored hemisphere portion B of the indicator ball 13 of each indicator unit would appear in the various openings 14 and no indication would be visible against the black colored background of the panel P. If, however, it was desired to display the figure number "2," for example, on the character unit panel P, certain of the indicator units would be operated to their white indicating positions as shown in FIG. 3. Thus, with said certain of the indicator balls 13 displaying their white colored hemisphere portions W in their respective openings 14, the numeral "2" would be clearly outlined in white spheres against the black colored background of the panel P, as shown in FIG. 4.

Referring now to the mode of operation of a changeable indicator of the present invention as shown in FIGS. 2 and 3, by way of example there has been illustrated a typical three position polar control relay CR having a movable contact 40 for controlling the energization of the solenoid coil windings 20 and 21. As shown in FIG. 2, the control relay CR has been energized by current of one polarity to cause its contact 40 to move to its right-hand position. In this right-hand position, the contact 40 has completed an energizing circuit for the solenoid coil winding 20, thus causing a magnetic flux to be induced in its movable core piece 22 in a direction as indicated by the arrows to move it to its left-hand position. The movement of the core piece 22 to its left-hand position caused a movement of the indicator mechanism as previously described to position the indicating ball 13 in its normal black color indicating position. Energy may now be removed from the winding of the control relay CR, causing its contact 40 to seek its mid position and thus break the energizing circuit for the solenoid coil winding 20. However, the indicator unit will remain in its normal black color indicating position due to the bias of the spring 36 of the spring toggle device.

A movement of the indicator unit to its white color indicating position as shown in FIG. 3 is accomplished by energizing the winding of the control relay CR by current of an opposite polarity. This causes movement of its contact 40 to a left-hand position and completes an energizing circuit for the solenoid coil winding 21. With the coil 21 thus energized, a magnetic flux is induced in the movable core piece 22 in a direction as indicated by the arrows to cause it to move to its right-hand position. As previously mentioned, with the core piece 22 in its right-hand position, the indicator ball 13 is caused to assume its white color indicating position. Again, the control relay CR may be deenergized and the indicator unit will be retained in its white color indicating position by means of its spring toggle device.

From the foregoing description and with reference to the drawings, it should be seen and understood that the changeable indicator of the present invention provides a simple and economical device which is readily adaptable to various types of display devices. It may be used as a single unit or in multiple quantities to create a display of data on signs, billboards and the like. The complete panel units may be suitably enclosed to protect the indicators against the elements and transparent plastic shields 41 or the like may be used to cover the openings 14 in the panels. Also, the provision of a spring toggle device to retain the indicator unit in its last operated position results in energy savings as it is only necessary to use energy when operating the device from one indicating position to the other.

Having thus shown and described one specific form which the present invention can assume and the manner in which it is to be performed and the utility thereof, it is desired to be understood that such form and application thereof was chosen more for the purpose of illustrating the principles and mode of operation rather than for indicating the full scope. It should be further understood that various other modifications, adaptations and alterations could be applied to the specific form shown within the scope of the present invention, except as limited by the appending claim.

What I claim is:

A changeable indicator for a character display unit comprising, a frame, a ball indicator mounted for rotary movement on said frame, said indicator having a first distinctive identity on one hemisphere and a second distinctive identity on a second hemisphere, an electromagnetic structure having first and second coil windings with central core openings and a movable core member located therein, a gear sector operatively connected to said core member, a pinion gear mounted on said frame in intermeshed relationship with said gear sector operatively connected to said ball indicator, a pair of stop pins mounted on said frame for determining the terminal positions of movement of said gear sector, energizing means for selectively energizing said first and second coil windings of said electromagnetic structure and a spring biased toggle device operated by said gear sector in response to the movement of said core member toward said one selectively energized coil windings to retain said ball indicator in its last operated position as determined by the movement of said gear sector into registry with one of said stop pins when said one selected first and second coil windings is deenergized.

References Cited in the file of this patent

UNITED STATES PATENTS

| | | |
|---|---|---|
| 809,796 | Grabosch | Jan. 9, 1906 |
| 2,513,375 | Stearn et al. | July 4, 1950 |
| 2,585,974 | Taylor et al. | Feb. 19, 1952 |
| 2,644,939 | Ebel et al. | July 7, 1953 |
| 2,740,955 | Barrett | Apr. 3, 1956 |

FOREIGN PATENTS

| | | |
|---|---|---|
| 398,893 | Great Britain | Sept. 25, 1933 |
| 716,167 | Great Britain | Sept. 29, 1954 |
| 740,780 | Great Britain | Nov. 16, 1955 |